UNITED STATES PATENT OFFICE.

MAX FREMERY, OF OBERBRUCK, AND EMILE BRONNERT, OF MÜLHAUSEN-NIEDERMORSCHWEILER, GERMANY, AND JOHANN URBAN, OF ST. POLTEN, AUSTRIA-HUNGARY.

PROCESS FOR THE MANUFACTURE OF THREADS OR FILMS OF CELLULOSE.

No. 806,533.        Specification of Letters Patent.        Patented Dec. 5, 1905.

Application filed May 8, 1905. Serial No. 259,479.

*To all whom it may concern:*

Be it known that we, MAX FREMERY, residing at Oberbruck, Province of the Rhine, and EMILE BRONNERT, residing at Mülhausen-Niedermorschweiler, Alsace, in the German Empire, subjects of the German Emperor, and JOHANN URBAN, a subject of the Emperor of Austria-Hungary, residing at St. Polten, in the Empire of Austria-Hungary, have invented certain new and useful Improvements in Processes for the Manufacture of Threads or Films of Cellulose, of which the following is a specification.

A known process for the manufacture of artificial silk consists in injecting a solution made by dissolving cellulose in a cupriferous ammoniacal solution through capillary tubes into a liquid capable of precipitating the cellulose, such as dilute acetic acid, winding the wet thread thus produced onto a roller revolving in a bath of dilute acid, such as acetic acid, and after washing away the ammonia and copper drying under tension.

The economical value of the process above described resides in the fact that both the ammonia and copper can be recovered from the acid solution. When, however, the process is used for making threads of considerable thickness or for making films, for which purpose large capillary tubes or slit-shaped openings must be used for the injecting apparatus, the threads obtained are so dull and inelastic that they are practically useless and the films are not transparent and are brittle and inelastic.

By the present invention the cellulose solution is injected into an acid, preferably sulfuric acid of thirty to sixty-five per cent. strength, as described in United States Patent Specification No. 698,254, whereby the advantage of recovering the copper and ammonia is retained, but the threads or films produced are treated with a strong caustic-alkali solution—for instance, a cold solution containing not less than twenty per cent. of caustic soda. For this purpose the threads or films as they are produced may be wound on a cylinder, which is then rotated for some time in a bath of cold strong caustic-alkali solution, or the threads or films may be placed in the perforated drum of a centrifugal apparatus and the cold strong caustic-alkali solution may be introduced under pressure through the axle of the drum. In either case the treatment is followed by washing with water, preferably in the manner described in United States Patent Specifications Nos. 661,214 and 705,748, until all caustic soda has been washed from them, and finally with water containing a small proportion of a dilute acid, like acetic acid. The threads or films are then dried under tension, as described in United States Patent Specifications Nos. 650,715 and 691,257.

The films and thick threads made according to this invention are as transparent as glass, very strong, and about twice as elastic as those produced by the older processes.

Having thus described the nature of this invention and the best means we know of carrying the same into practical effect, we claim—

1. A process for the manufacture of threads or films of cellulose consisting in injecting into an acid a cupriferous ammoniacal solution of cellulose and then treating the cellulose form thus produced with a strong solution of caustic alkali.

2. A process for the manufacture of threads or films of cellulose consisting in injecting into an acid a cupriferous ammoniacal solution of cellulose and then treating the cellulose form thus produced with a strong solution of caustic alkali and finally washing the form with water and a dilute acid and drying it under tension.

3. A process for the manufacture of threads or films of cellulose consisting in injecting into an acid a cupriferous ammoniacal solution of cellulose and winding up the cellulose form thus produced on a cylinder whereon it is afterward treated with a solution of caustic alkali.

4. A process for the manufacture of threads or films of cellulose consisting in injecting into sulfuric acid a cupriferous ammoniacal solution of cellulose, winding up the cellulose form thus produced on a cylinder which rotates in a strong solution of caustic alkali, then washing the form with water and a dilute acid, and drying it under tension.

5. Threads or films of cellulose prepared by injecting into an acid a cupriferous ammoniacal solution of cellulose and treating the cellulose form thus produced with a strong solution of caustic soda.

In testimony whereof we have signed our names to this specification in the presence of subscribing witnesses.

MAX FREMERY.
EMILE BRONNERT.
JOHANN URBAN.

Witnesses to the signature of Max Fremery:
HENRY QUADFLUG,
GERARD OELLERS.

Witnesses to the signature of Emile Bronnert:
ALBERT GRAETER,
GEO. GIFFORD.

Witnesses to the signature of Johann Urban:
ALVESTO S. HOGUE,
AUGUST FUGGER.